(12) United States Patent
Faratin et al.

(10) Patent No.: US 8,862,534 B1
(45) Date of Patent: Oct. 14, 2014

(54) SOFTWARE SERVICE INFRASTRUCTURE INDEXING USER DEMOGRAPHICS, INTERESTS AND EXPERTISE

(71) Applicant: Robust Links, LLC, New York, NY (US)

(72) Inventors: Peyman Faratin, New York, NY (US); Cheng Shi, New York, NY (US)

(73) Assignee: Robust Links, LLC, New York, NY (US)

( * ) Notice: Subject to any disclaimer, the term of this patent is extended or adjusted under 35 U.S.C. 154(b) by 58 days.

(21) Appl. No.: 13/708,072

(22) Filed: Dec. 7, 2012

Related U.S. Application Data

(60) Provisional application No. 61/567,770, filed on Dec. 7, 2012.

(51) Int. Cl.
  *G06N 5/02* (2006.01)
  *G06N 5/04* (2006.01)

(52) U.S. Cl.
  CPC ............... *G06N 5/022* (2013.01); *G06N 5/046* (2013.01)
  USPC .............................................. 706/50; 706/45

(58) Field of Classification Search
  None
  See application file for complete search history.

(56) References Cited

U.S. PATENT DOCUMENTS

| | | | |
|---|---|---|---|
| 7,734,641 B2 | 6/2010 | Kanigsberg et al. | |
| 2008/0104061 A1 | 5/2008 | Rezaeo | |
| 2010/0268661 A1 | 10/2010 | Levy et al. | |
| 2011/0258196 A1 | 10/2011 | Lepsoy et al. | |
| 2012/0239501 A1 | 9/2012 | Yankovich et al. | |
| 2012/0254246 A1 | 10/2012 | Kerger et al. | |

OTHER PUBLICATIONS

Wang, et al., Learning Relevance from Heterogeneous Social Network and Its Application in Online Targeting, SIGIR'11, Jul. 24-28, 2011, pp. 1-10.*

Evgeniy Gabrilovich; Shaul Markovitch; Computing Semantic Relatedness using Wikipedia-based Explicit Semantic Analysis; Department of Computer Science; Technion—Israel Institute fo Technolgoy, 32000 Haifa, Israel, pp. 1606-1611.

Dik L. Lee; Huh Chuang; Kent Seamons; Document Ranking and the Vector-Space Model; IEEE Software; Mar./Apr. 199; pp. 67-75.

* cited by examiner

*Primary Examiner* — Wilbert L Starks
(74) *Attorney, Agent, or Firm* — Stolowitz Ford Cowger LLP

(57) ABSTRACT

This disclosure pertains to methods and systems for predicting demographics and psychographics of any application object (user or item), and matching them to other objects based on an aggregated similarity scores derived from location and unstructured textual data. In some embodiments, vector-space representation may be used for matching, with demographic weights dynamically computed, for example, based on census data distribution information. Psychographic similarity may be computed, in some embodiments, on the basis of both non-classical semantic relatedness—finding implicit connections between terms in a knowledge source, and categorical information embedded in the knowledge source, preferably a large corpus such as Wikipedia.

17 Claims, 9 Drawing Sheets

US 8,862,534 B1

SOFTWARE SERVICE INFRASTRUCTURE INDEXING USER DEMOGRAPHICS, INTERESTS AND EXPERTISE

RELATED APPLICATIONS

This application is a non-provisional of U.S. Provisional Application No. 61/567,770 filed on Dec. 7, 2011 and incorporated herein by this reference.

COPYRIGHT NOTICE

© 2011-2012 Robust Links, LLC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This invention pertains to methods and systems for predicting demographics and psychographics of users and matching them to other objects and users based on geographic, demographic and psychographic similarities.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present disclosure, in one aspect, describes a computer-implemented system that infers user demographics (from their location) and their interests (from their unstructured text) and then matches them to persons and or other objects (offers, goods, services). It exploits geographic location of a user if available, demographic information, and psychographic information, e.g. expertise and interests, of the user, for assessing similarity of the user to other users or objects. In one example, the U.S. Census and the content of Wikipedia are indexed to form knowledge bases to support matching analysis.

Additional aspects and advantages of this invention will be apparent from the following detailed description of preferred embodiments, which proceeds with reference to the accompanying drawings.

DETAILED DESCRIPTION OF PREFERRED EMBODIMENTS

The present disclosure and concepts may be implemented in various ways, including as a system, SAS, server, process, apparatus, application and/or various computer executable programs or instructions. This disclosure is not intended to be limited to any particular implementation. Rather, the implementation details discussed below are merely to illustrate the inventive concepts.

One aspect of the present disclosure is to create a trusted software agent that represents and reasons over the state of its user. It does so by building one or more indexes, which we call OpIndex. OpIndex is designed to support queries, for example, of the following types:

"Find all entities in unstructured data, possibly in real time"

"Find the degree of relationship between entity, with characteristics C, to all other entity/entities with characteristics C in a corpus of (un)structured data".

"Find all entities, with characteristics C, in (un)structured data who may have relationship R to entity/entities with characteristics C".

There is prior art in the areas of "recommendation" and "personalization" systems. For example, co-occurrence among playlists can be used as a metric for similarity of music or other media items. However, our innovation is different in several ways, not least of which is that we assume reasoning is occurring in an open system where there is no structured information over users or application objects. We therefore harness the knowledge from Collective Intelligence to assist in solving the unstructured information problems that are involved in the inference problems above. Toward that end, in a preferred embodiment, we use Information Retrieval, Artificial Intelligence and Natural Language Processing tools to index the content of two knowledge repositories: Wikipedia and US 2011 Census data.

The primary application we discuss in this document is how the agent can derive one particular relationship, "interest_of", of its user. We then use this knowledge to build a matching service which can be variously adapted and configured for numerous applications.

Figure 1:
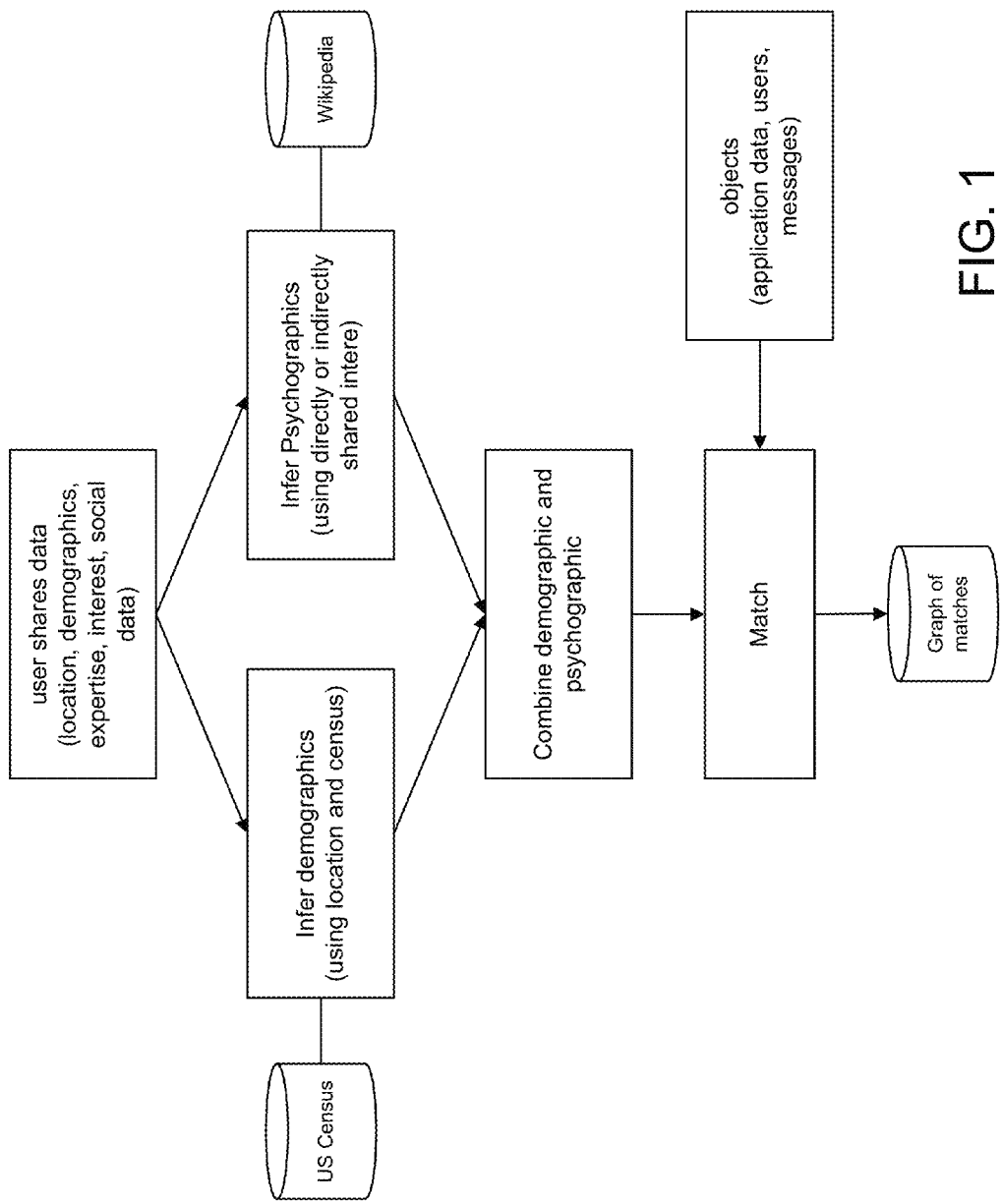
FIG. 1 is a simplified overview of the logic consistent with the present disclosure.

FIG. 1. shows the overall processes involved. We are given (1) user's location as geo or ZIP code, (2) possibly zero or more demographic variables and (3) their explicit interest/expertise, or access to external data that can be used to infer user interest/expertise. This latter information is assumed to be represented in natural language. We then use various knowledge sources to normalize, structure, reason and predict user's demographic and psychographic profile. The same process can be used to model demographic and psychographic profile of objects in an application (described via their location and text describing their content). For instance, in an ecommerce application a product sold in New York City maybe described by its sale location, its name as well as a description in natural language. Therefore users and objects are interchangeable in our system. Once modeled, the system can match users to other users or application objects using the derived models.

Figure 6:
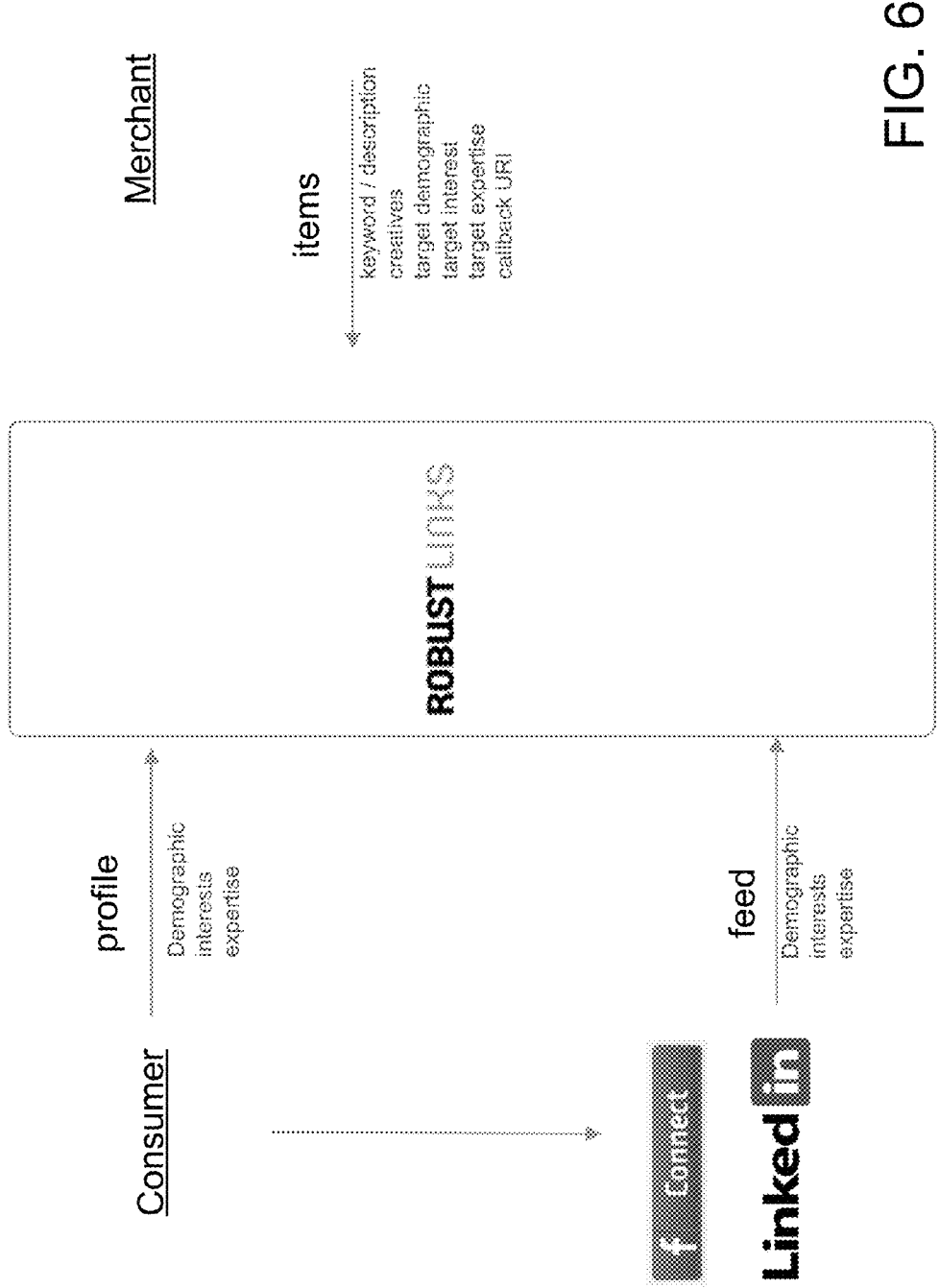
FIG. 6 is architecture of one embodiment in ecommerce where OpIndex is used to match consumers to items, consistent with the present disclosure.
Figure 7:
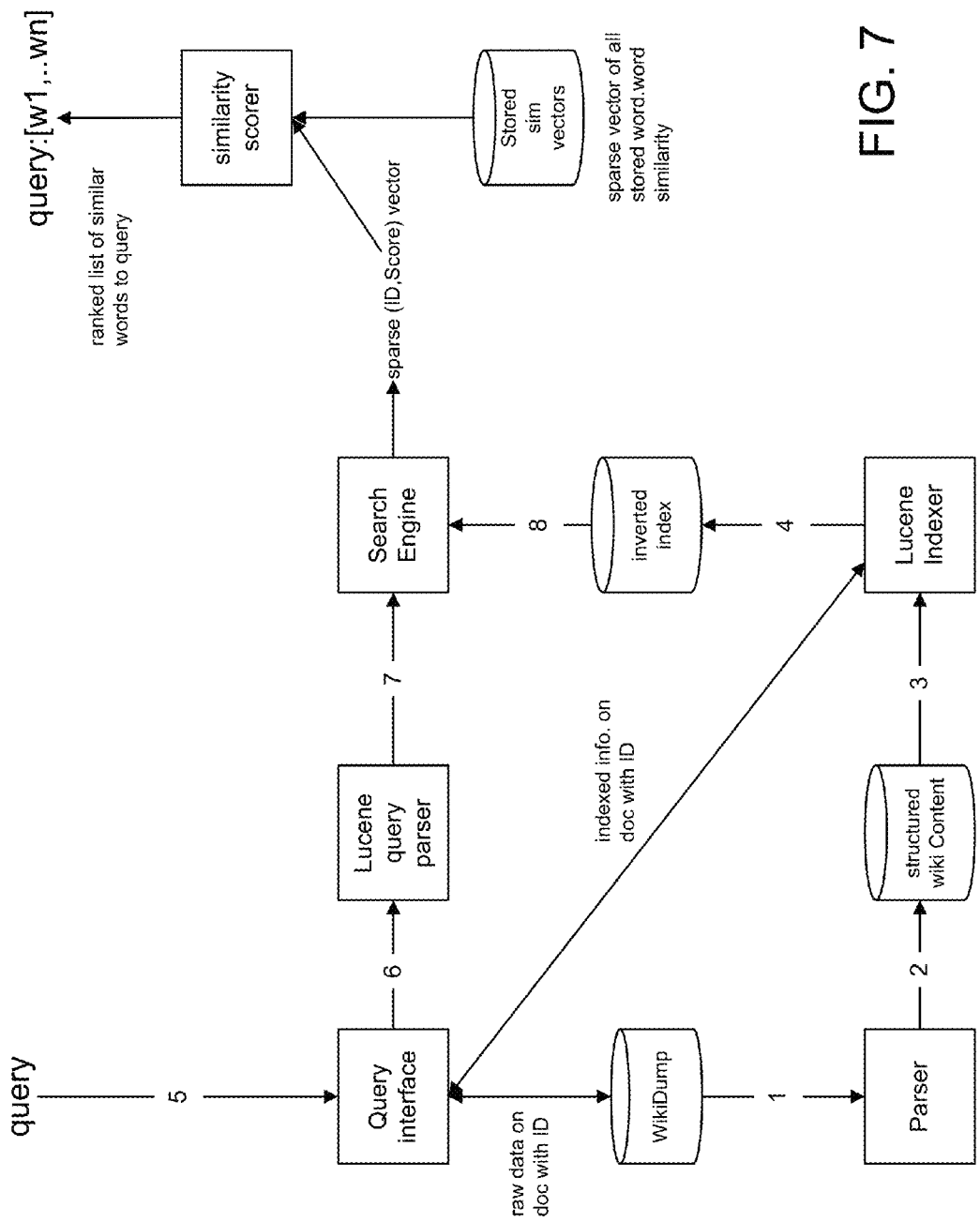
FIG. 7 is the flow of data and steps involved in building and querying the psychographic knowledge base consistent with the present disclosure.

To illustrate, the matching service can be applied for matching between user interests and 1) inventory items in a retail ecommerce (FIG. 6) and 2) apps in smart phone app marketplaces. With regard to one aspect of this disclosure, we built a mobile app recommendation on a mobile device that demonstrated the power of underlying OpIndex. That is, we built a mobile app for recommending mobile apps in order to demonstrate our technology. We chose this because app discovery is becoming a growing problem (675,800 apps in the marketplace, with 39,000 and 16,260 apps being added to the Android and Apple app stores per month, respectively. Consumers typically discover new apps either through word of mouth, the app store's search function and leader-boards, or collaborative filtering ("people who downloaded X also downloaded Y").

App stores could be made more efficient if there were more liquidity in the market, specifically with respect to niche apps. Our system, which we call BigSieve, is a personal software agent that runs as smart mobile app. Users download the app and opt-in to incrementally share context information, minimally including current location, and potentially expertise, interest and demographics (for example, age, gender, education, home ZIP code). Each BigSieve agent communicates its user's (profile and behavioral) model to a trusted central server, which we call our Robust Links matching server. An ensemble of software-implemented techniques, further described below, then matches users based on their reported expertise, interest, opinions and demographics. Once matched, similar users access the app inventory of other similar users. For instance, a user who has revealed himself or herself as an expert in business would see (and follow) apps of other users who have expertise similar to that of entrepreneurs, financiers, etc. Users can increase the quality of the social recommendation by sharing more information.

In the course of our mobile research and development we discovered another opportunity that furthered our objective to become a trusted agent. Currently third parties (developers and advertising networks) in coalition are covertly tracking mobile users. Developers are sending users' private registration information (demographics) and behavioral data to advertising networks.

One objective of our OpIndex is to be a trusted agent resource. If users opt in to share private information with the matching service, then the agent can protect the consumer from such tracking behavior. We therefore designed a privacy protocol that can run on a mobile device. In particular, the protocol allows a new user, one whom an ad network knows nothing about currently, the option to share minimal information that can be found in public databases (age, gender and ZIP code) directly with the ad network as quickly as possible. In return, the ad network agrees to: (1) allow all future communication to be mediated through a Robust Links SDK, which they integrate and distribute with future releases of their SDK; (2) be contractually obligated to not use any device side unique identifier for tracking; and (3) comply with audit of the SDK source code, whose binaries they distribute to app developers. All communication is managed by a low cost cryptographic protocol. For trust purposes the protocol may be open-source, allowing anyone to inspect the code. The data that achieves the desired outcome is private to the communicating parties.

Figure 3:
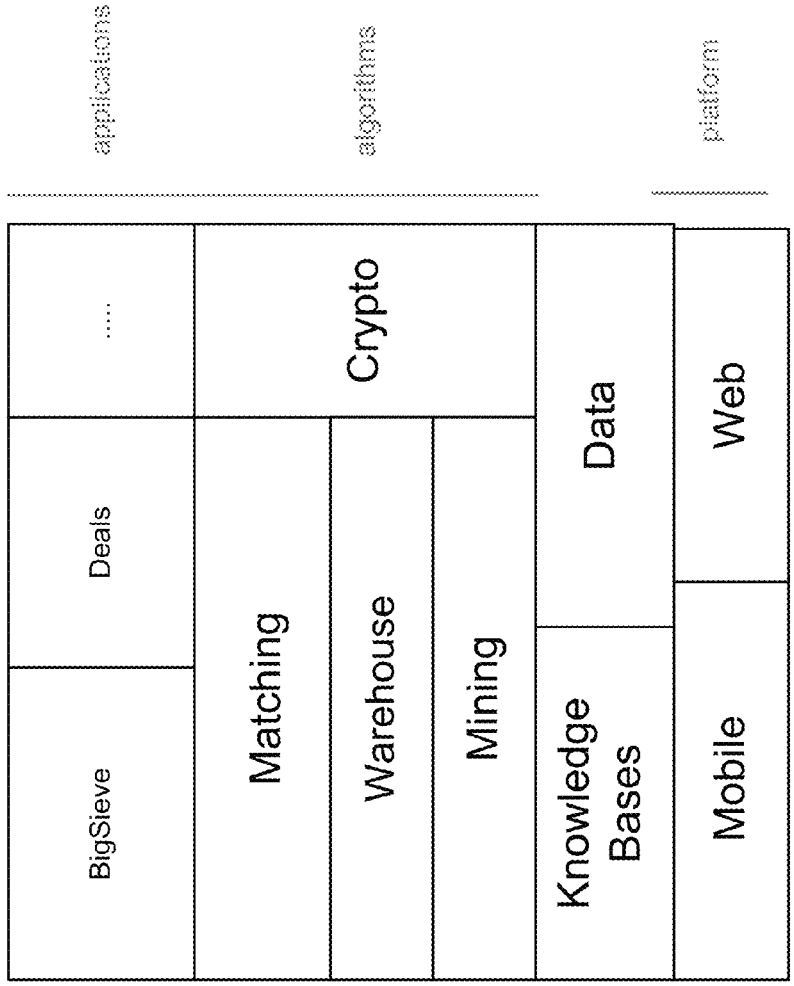
FIG. 3 is the architecture of the system, describing the components of the system, consistent with the present disclosure.
Figure 4:
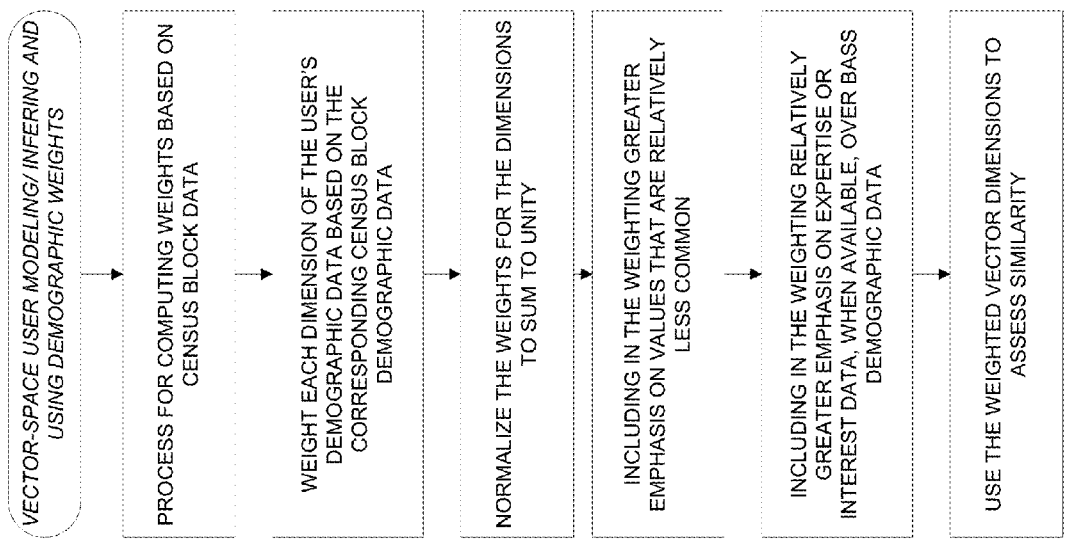
FIG. 4 is a simplified flow diagram illustrating a vector-space method for assessing similarities utilizing adjusted demographic weighting.
Figure 5:
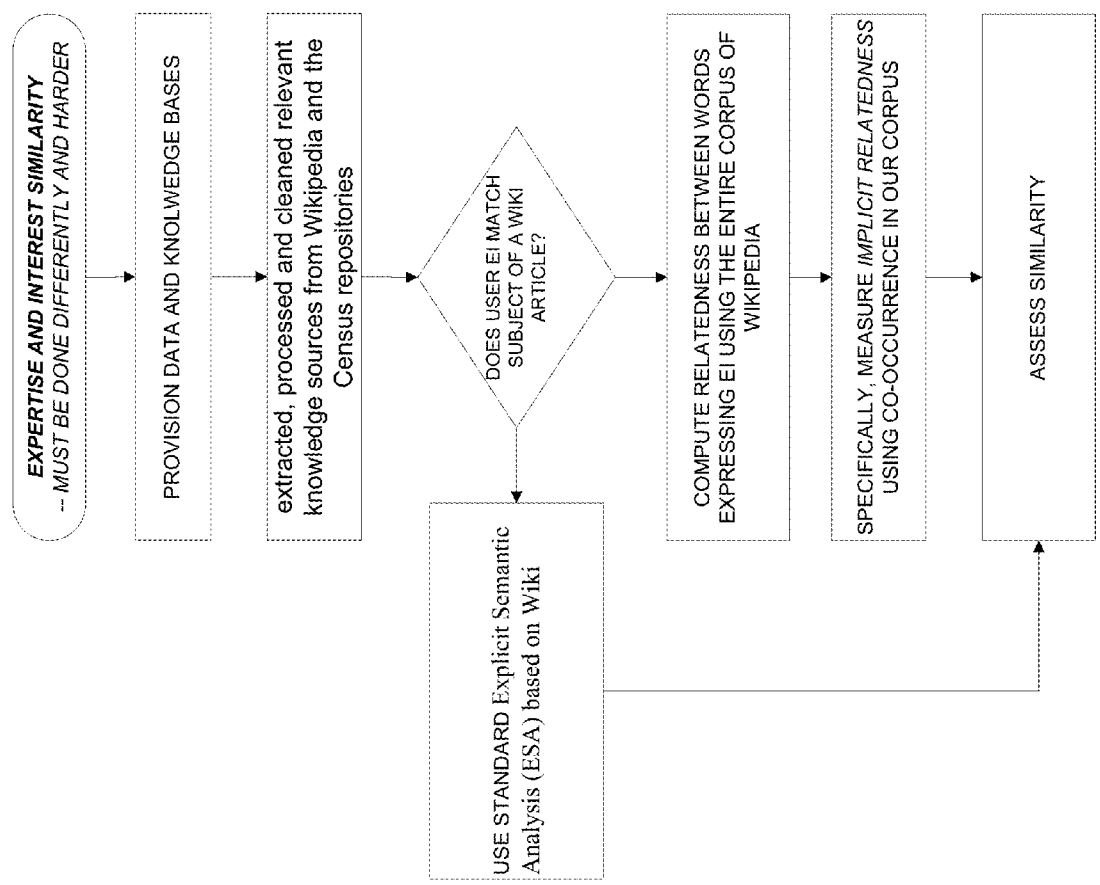
FIG. 5 is a simplified flow diagram illustrating a non-classical semantic relatedness method for assessing similarities.

FIG. 3 shows the overall service architecture of OpIndex in one embodiment. The first task was to determine how each information class (demographic, interest and expertise) could be elicited with minimal transaction and trust costs to the user. Given the potentially sensitive nature of some dimensions, a critical requirement was to give the users freedom to share information incrementally in exchange for better quality of service. We focused on the smart mobile agents and connection to third party data providers (such as Facebook Connect), to satisfy the minimal transaction cost requirement in one embodiment. Mobile devices were chosen because they are rich in context and users are becoming behaviorally accustomed to opting-in and sharing this contextual data with applications in exchange for value. We decided to focus on the Apple IOS agent as an initial starting point. It was used by way of illustration and not limitation.

In FIG. 3, the Data layer represents the repository of at least two sources of provenance information: (1) a seven dimensional information set (including demographic, expertise and interest) which the users have shared with the service, and (2) derived data from behavioral usage (clicks and content contributed). The use of seven-dimensional information is merely illustrative and not critical. Data sharing can occur in two modes: (1) directly and privately by the user, for example using the mobile app to communicate with the trusted server, or (2) indirectly through a data service provider such as social network (Facebook, Twitter and LinkedIn). If the user has shared their data indirectly through a third party service provider, then technologies implemented at the mining layer extract from the user's feed the relevant IAO (Interests, Activities, Opinions) variables and values.

The Knowledge Base (KB) layer in turn consists of open knowledge repositories that were used as input to an ensemble of algorithms. In one illustrative embodiment, we used two classes of Knowledge Bases: (1) the U.S. Census data for the demographic algorithms, and (2) the complete Wikipedia dump, for the expertise and interest ("EI") algorithms.

Once data and knowledge were provisioned, the Warehouse layer: (1) extracted, processed and cleaned relevant knowledge sources from Wikipedia and the Census repositories, and (2) warehoused the transformed data and knowledge into a persistent cloud infrastructure, accessible by the Matching layer.

The primary function of the matching layer is to compute a bipartite graph of objects, given object data and the two Knowledge Bases. Links of the graph then represent the degree of similarity between the objects.

We also designed a cryptographic protocol that permits mobile phone users to opt-in and share any component of their data with third parties in a secure and private manner. Other layers such as Web interface are known and therefore not described in detail.

Mining and warehousing layers organize contextual information needed by the matching layer. Technologies at these layers were designed to address problems assuming context information: 1) is elicited through an application layer at first unspecified, 2) arrives incrementally over time, and 3) is non-stationary, incomplete and noisy. To enable, for example, ecommerce business models, we wanted to enable matching not only over users but also with respect any object whose "context" could be characterized. For instance, a Groupon deal X is for "women, aged 30 and above interested in shoes". For one embodiment, we chose a bipartite graph to organize this information. Given an object (characterization), we want to compute, online and in order of milliseconds, the similarity of that object to all other objects in the system. If the object is a user, then in the worst case they may have shared only their current location. In a mobile application this would correspond to the workflow where the user turns on their mobile device and only provides current location permission to the service. The user may share additional data, directly or indirectly.

In the best case, the user may have directly provided some or all demographic, interest and expertise information about themselves. This may be conveniently done, for example, by mobile app or web interface. In between these two extremes, the user information may come, in whole or in part, from a data service provider, and the data may be noisy and non-stationary, requiring mining. We therefore had to solve the following problems: (1) how to model objects, (2) how to reason about similarity over each dimension, (3) algorithms that implement the reasoning, at scale, (4) how to infer variable values when—(i) data is not directly provided by the users but a data provider like Facebook (mining problem) and (ii) user has provided an incomplete set of dimension values (imputation problem). We first describe how we model an object, the preferred reasoning model chosen and illustrative algorithms that implement that model. The objects in the discussion below are restricted to users, but the model is applicable to other types of objects (such as deals or media), as long as they can be characterized along one or more required dimensions.

User and Matching Model:

We chose a vector-space representation for matching in a preferred embodiment. We did so because compared to alternatives, vector-based models are more robust for our natural language needs. We represent users in a multi-dimensional vector space. Each element of the space represents a feature of the user along the variables of interest (for example, age, gender, ZIP, education, expertise and interests). Let $d^j_i$ represent the $i^{th}$ entry of this m dimensional vector for user j. We then represent a user as an m dimensional vector:

$d_{i \in m}^j$ where m={age,gender,ZIP,education,expertise,interest}

The domain of dimension i is represented as $D(d_i)$. Each dimension i also has an importance factor, called its weight $w_i$. We then define the similarity of two users k and l along all dimensions as:

$$\text{Sim}(u^k, u^l) = \sum_i^m w_i \cdot \text{sim}(d_i^k, d_i^l) \text{ where Sim}() \in [0, 1]$$

In other words, similarity of users k and l is the linear weighted combination of individual similarity of users along all m dimensions. Similarity of two users k and l along the ith dimension (demographic, interests, etc) in turn is defined as follows.

Demographic Similarity:

For demographic dimensions we define the following similarity functions:

$\text{sim}(d_i^k, d_i^l) =$ $$\begin{cases} \text{if } i = \text{age} & \text{sim} = \frac{h(k) - h(l)}{\max(\text{age}) - \min(\text{age})} \\ \text{if } i = \text{gender} & \text{if } (\text{gender}(k) = \text{gender}(l))\text{sim} = 1 \text{ else sim} = 0 \\ \text{if } i = \text{education} & \text{sim} = \frac{h(k) - h(l)}{\max(\text{level})} \end{cases}$$

$\text{sim}(d_i^k, d_i^l) \in [0,1]$ where h( ) maps values to a metric space. Seven levels of education were chosen, ranging from "less than ninth grade" to "graduate or professional degree". max(level) was therefore chosen to be seven.

Dimension Value Imputation:

Preferably, service quality should increase monotonically with the level of information shared by the user. The minimal service requirement was either user's current location (to match them based on demographics) or expertise/interest. The problem to solve in the case of incomplete demographic information then was how to match users given only their location. One solution to this problem was to model the demographic dimensions of a user based on the statistical distribution for the current block in the US Census data. Comprehensive Census data is available on a level of specificity down to the block group level. Using this data, if the value of a demographic dimension has not been provided by the user, the user's profile is imputed using a statistically probable attribute given the user's place of residence. For example, if a user has provided age and ethnicity but not income, it is possible to deduce that the user is most likely one of a particular subset of individuals living in a given area, and further make the assumption that he or she is statistically likely to have a certain income based on the income distribution of local individuals sharing the known attributes.

Inferring and Using Demographic Weights $w_i$:

Census data distribution information was also used to dynamically compute the weight of each demographic variable. A census block group distribution is represented as a simple data structure containing the range of people fitting each possible attribute value. For example, for a given block group B representing a block in the hypothetical town of Somewhere, N.Y., the distribution across the attribute education might be "Bachelor's Degree: 397, High School: 403, . . . " and the distribution across the attribute age might be "18-25: 91, 26-35:171, 36-45:15 . . . " Expressed in plain English: "Within (the group of blocks B in) the town Somewhere, N.Y., 403 people have a high school education, 397 people have a Bachelor's Degree, 91 people are between the ages of 18 and 25, . . . ", etc.

We then compute the weight of each demographic dimension of each user given user's demographic data and the corresponding census block demographic data. Weight of each dimension is based on the distribution of that dimension in the census block data. For instance, imagine a user of 44 years of age with High school education. We know from blocks B data that only 15 people in that block are within the 36-45 years of age, compared to majority of 26-35 year old. And majority has high school education. We then normalize the weight of each dimension by making the sum of the weight of each dimension add to unity. In a preferred embodiment, we put higher weight on user's age than education, because this user's age is quite rare but their education level is common.

In a preferred embodiment, wherever expertise or interest data are available as inputs, they are assigned very high or maximum weight values due to the preferred nature of this special information relative to basic demographics data. Therefore matching results will be ordered by similarity of expertise and/or interests primarily and by similarity across demographics secondarily.

Expertise and Interest Similarity:

To compute similarity between user's expertise and/or interest ("EI" henceforth) required a different strategy than demographic dimension. In particular, users can: (1) unlike demographic variables, have more than one interest or expertise, (2) change more frequently, and (3) express them in natural language. Defining an axiomatic measure of similarity akin to the demographic dimension above was not possible because of the difficulty in defining a Euclidean distance of meaning of words that express EI.

Instead, the basis of similarity we chose was non-classical semantic relatedness—finding implicit connections between terms in a knowledge source. Non-classic semantic relatedness models can establish term-term relationships even if they are not similar or do not have similar parts of speech. For instance, the terms "Barack Obama" and "hope" would not have any relationship under classic models of lexical relationship but do under non-classical. In other words lexical "ontologies" created by the "wisdom of the linguists" have lower coverage for types of words in our domain. WordNet, the most extensive ontology, contains very little domain-oriented knowledge and is populated with only a few thousand instances, i.e. named entities.

We therefore decided for purposes of illustration to compute the relationship between words expressing EI using the corpus of Wikipedia, because not only does it provide a corpus of evolving words but also a Collective Intelligence process is continuously disambiguating words and constructing an explicit topic model, where each article is about a concrete topic. If users express an interest or expertise that has a corresponding Wikipedia document, then Wikipedia could potentially be used as a valuable knowledge base, allowing us to perform Explicit Semantic Analysis.

To utilize the "wisdom of the crowd" we had to first develop a model of words and their similarity. In particular, we had to solve the following problems: (1) how to represent the relationship environment, (2) how to compute word-to-word similarity relationships, (3) how to represent users with multiple expertise and interests, and (4) how to compute the similarity relationship between users given a vector of interests and expertise. Recall that we chose a non-classical relational semantics, meaning words are related if they have some implicit relationships with one another. The implicit relationship we chose was co-occurrence. If two words co-occurred in a corpus then they were related. If three different users expressed their interests as "wind surfing", "hang gliding" and "books" then if "wind surfing" co-occurred more frequently in the corpus with "hang-gliding" than "books" then it was reasonable to assume "wind surfing" was more related to "hang gliding" than "books".

The representation problem was then what was the co-occurrence environment: sentence, document content or document category? We initially chose the sentence level strategy, breaking up the entire Wiki content into individual sentences and basing word similarity on co-occurrence at the level of sentences. However, we found this strategy was not only operationally costly but also the representation was throwing away valuable topic information that Wiki pages encoded. If an EI term has a corresponding Wiki article then that is important information that can be used. As explained below, when users provided information about their interests directly, document content, in particular term frequency described below, was chosen for the representation problem.

When interests and expertise were expressed indirectly (and continuously, through third party data providers), we chose the document category representation.

Another problem we had to solve was word disambiguation. If a user expressed their expertise as the term "android" then the disambiguation problem was determining which sense of the term the user intended: robot, movie, OS, etc.? Word sense disambiguation is an extensively studied area of research. We approached this problem in one of two ways. If possible the user was asked to disambiguate the word sense returned by a Wikipedia disambiguation page. Alternatively, as explained below, if a word had a corresponding Wiki article or redirect page then we used the categories of that page to boost pages that had similar categories to that page at search time. We'll explain the latter strategy in more detail below.

Direct Sharing of IE:

When users directly provide their interest or expertise we first represent the word (phrase) as a Term Frequency Inverse Document Frequency (TF-IDF) vector in the Wikipedia document content space. That is, we compute, for example using Apache's Lucene, the frequency (and inverse document frequency) score of that interest/expertise word in the content of every document in Wikipedia. TF-IDF increases the weight of a term if that term occurs many times in a document (TF component) but punishes the term's weight if it occurs too many times in the corpus (IDF component). Similarity between two users k and l along interest or expertise is then computed as the dot product of their TF-IDF score (represented as score), defined as $$\text{sim}(d_i^k, d_i^l) = \frac{\sum_{p=0}^{p=P}(w_p \cdot (\text{score}_p^k)) \cdot (w_p \cdot \text{score}_p^l)}{\sqrt{\sum_{p=0}^{p=P}(\text{score}_p^k)^2} \cdot \sqrt{\sum_{p=0}^{p=P}(\text{score}_p^l)^2}}$$

where $i \in \{\text{expertise, interest}\}$ where $\text{score}_p^k$ is the TF-IDF score of the expertise/interest word of user k in the contents of the Wikipedia page p. In other words, we count the frequency of the times the word representing user interest/expertise occurs in the content of each Wikipedia document, and modify it with the length of that document. P is the total number of documents in Wikipedia (1.6 million in the case of our final data). User interest or expertise is then represented as a P dimensional vector. Then to compute the similarity of two users we compute the dot product of the TF-IDF score of each user's interest/expertise for each page, weighted by the importance of that Wikipedia page, $w_p$. We then normalize the result with the length of the vectors (the denominator). Note, if user k's and is interest/expertise both co-occur in Wikipedia article p then their dot product is non-zero. In other words, dot product is a (richer) representation of co-occurrence.

Word Disambiguation Through Article Weight Problem:

The next problem we had to solve was how to determine the importance of each Wikipedia article $w_p$. We need to do this to solve the word disambiguation problem—pages that contain one or both terms whose similarity we are calculating should be given higher importance ("boost") at search time if the page shares some common information with those terms. The common information we chose was the category of the page with category of the terms. If a page's category is the same as the category of one or both of the terms then the weight of that page is increased.

Pseudo code below summarizes this two filters (presence and category "sameness") logic:
1. given terms (t1,t2)
2. for(doc p in Wikipedia){
3. if(dotproduct(t1,t2)>0 in ContentOf(p)){/* first filter: both terms occur in document p */
4. C1=categories(t1), C2=categories(t2), Cp=categories(p)
5. if(Cp same(C1 OR C2))/* second filter: category of page is same as categories of one or other term */
6. w(p)=f(informationContent(Cp))
7. else
8. w(p)~0}

To be liberal we increased the weight of the document if it contained one or both terms (line 5. A more conservative strategy would have been AND, requiring both terms to occur in a document before the weight of that document was increased. But this strategy throws away information). This way article categories are used to disambiguate articles when measuring similarity of two words. For instance, imagine we are comparing the similarity of two users one who has expressed their interest using word "apples" and another "oranges" (line 1). We first search for Wikipedia documents that have those terms in the title. If there are any then we retrieve their categories (line 4). Assume both words have category "fruits". Then if the two words "apples" and "oranges" co-occurred in two different documents (line 3), one with category "analogies" and other "food" then we would want to weight the "food" document higher than the "analogies" document. This example demonstrated another problem that needed to be solved—how do we measure category "sameness" (line 5)—knowing that category "fruit" is related to category "food"? The simplest criterion is equality; two pages are the same only if they both have exactly the same category (a Jaccard coefficient).

However, more is needed to support reasoning over non-identical categories. We observed that the Wikipedia categories are organized as a directed graph. Therefore we can use this structure to compute the importance of a category using either path-based or information-content based strategies. Path-based methods however were not appropriate for our problem. For instance, assume category "fruit" (of page "apple") has "edible" and "living things" as its parents in the category graph. Now imagine we retrieve the page of David Hasselhoff which contains both terms "apples" and "oranges" again but this time the category of the containing page is "actor". Parent of "actor" category is in turn "humans" and "living things". A path based strategy would erroneously lead us to give equal weighting to a page with a "fruit" category as one with "actor" category because they are both 2 hops from the "living things" category. We therefore chose information content (IC) measure. IC methods are instead based on an assumption that the similarity between two categories can be measured by the amount of information they share.

We define IC as follows:

$$IC(i) = numPagesOf(i) + \sum_{s=0}^{S(i)} numPagesOf(s)$$

where numPagesOf(i) is a function that returns the total number of pages that belong to category i and S is the total number of children nodes "below" category c in the graph.

The weight of a document i was then computed as the similarity of document's category $c_i$ with the category/categories $c_j$ of the term that occurred in that document (C1 or C2 in the pseudo-code above) in the category space, defined using the following information theory model:

$$\text{sim}(c_i, c_j) = 2 \cdot \frac{-\log\theta(\text{parent})}{-\log\theta(c_i) + -\log\theta(c_j)}$$

where parent is the common parent of categories i and j, $\theta(c)$ measures the probability of encountering an instance of c in the corpus, or IC in our case. We chose the following closed form for computing the similarity:

In summary, we have designed and built an algorithm that can compute:
similarity of two categories
find the lowest common parent of two categories, and
the information content of a category.
Multi-Dimensional Interests/Expertise:

If a user expressed more than one interest and/or expertise then we needed to define a way of aggregating each interest/expertise and then comparing them. To do so we defined the similarity of two users k and/with m and n interest/expertise vectors respectively as $$\text{sim}(d_i^k, d_i^l) = \sum_{p=0}^{m} \sum_{q=0}^{n} w_{pq} \text{sim}(d_i^k[p], d_i^l[q])$$

where $i \in \{\text{interest, expertise}\}$ where $d_i[p]$ is the pth representation of interest/expertise. The weight $w_{pq}$ was defined as $$w_{pq} = \frac{\text{sim}(d_i^k[p], d_i^l[q])}{\sum_{p=0}^{m} \sum_{q=0}^{n} \text{sim}(d_i^k[p], d_i^l[q])}$$

In other words, the weight of any pair of interests p and q is defined as a ratio of their similarity to the overall similarity.

Mining Layer.

The above model represents the workflow where users explicitly share their EI information. To support an agent service model where third party data feeds could be analyzed, we needed a solution to the problem of how to compute similarity of users based on feeds. For instance, Facebook users generate an online feed of likes and perhaps explicit interest. User's likes can be accessed by Facebook Graph API as a tuple (title,FBCategory), where title is the (unstructured) instance name of the item a content publisher marked-up and the user liked. FBCategory is the Facebook category the publisher chose to assign to that liked object in its Facebook graph. According to Facebook there are currently 38 pre-defined Facebook categories available for a content publisher to choose from. However, if we used Facebook's categories then clustering users would result in groupings too coarse grained to provide the desired personalization services. The like category of three users where one liked Virginia Woolf's "To the Lighthouse", the other "Hadoop in Action" and another who liked Kernigan and Richie's "Programming in C" would all be "books". Intuitively we want to say the second and third users are more similar to one another than the first.

To solve this problem we need to, like above, determine the relationship between the terms expressed by likes. We approached this problem also as an semantic analysis problem, using, the document space representation above, vector models, but now in the Wikipedia category space representation. The intuition behind our solution was that users could be better clustered and matched on their likes if we expanded the like data to a higher dimensional category space than Facebook's 38 categories. In particular, our approach involved the following steps: (i) first, we built a document candidate set; given a like described by a title we retrieved all the Wikipedia documents with the same title or redirect page as the like title. If this document set was empty then we retrieved a (TF-IDF) ranked list of the Wikipedia documents that contained the exact (i.e. non-sloppy) title of the liked item. If this set was also empty then we retrieved all Wikipedia documents that had the same title as the Facebook category, (ii) next the categories of each document in the candidate set were retrieved. The original user like was then mapped to matching category map, and finally (iii) we computed the pair-wise similarity of each category.

We defined the following model. Let $C_n$ represent the n-dimensional concept vector of Wikipedia (currently $n\sim 8\times 10^6$ concepts). Given a user's like instance we first retrieved the Wikipedia article that either (i) match exactly the title/redirect of the like instance title, or (ii) fuzzy match the content of all wiki articles, or failing those (iii) match the given Facebook category. We then retrieve the category of the matching article and represent it in the n dimensional category space. We refer to it by the symbol l $$l_i^t[j] \in \{0,1\}, 0 \leq j \leq n$$

representing user i's like at time t of category j. The length of $l_i$ is n, and each element of vector $l_i$ represents the presence or absence of category in the corpus category. Because a user may have many likes we also needed to aggregate them. We did this by keeping a running count of each category for each user and representing it as a vector of user i likes at time t:

$$L_i^t[j] = \sum_{h=0}^{h=m} l_h[j]$$

where $L_i[j]$ represents the aggregate of user i's like at time t category j after observing m like instances. The length of $L_i$ is also n, and each element of vector $L_i$ represents the cumulative counts of number of times user i has liked an item in that category. Finally, the similarity between users i and j is defined as $$\text{sim}(l_i, l_j) = \sum_{c=0}^{C} w_c(\text{score}(l_i) \cdot \text{score}(l_j))$$

where $w_c$ is a constant vector representing the weight of category c of Wikipedia concept. Weight $w_c$ is computed as described above, using the information content of the category. In summary, we compute the similarities of two likes exactly the same as a document space representation using the weighted product of their scores. However, since domain of likes in the category space representation are binary (a like either appears in a category or not) the product of the scores is equivalent to computing the Jaccard coefficient which measures the degree of similarity between two sets [Chakrabarti03].

The Cryptographic Layer

In an embodiment, our demographic matching algorithm was designed to match users based simply on their current location revealed by their geo-location on a mobile device. In our research on mobile infrastructure we discovered that various stakeholders in the mobile value chain (including advertising networks and developers) are using various techniques to identify and track users. Tracking is achieved through the Universal Device Identifier (UDID), which is a hash of the device hardware. Unlike a cookie on a browser, UDID can never be deleted and many infrastructures and services depend on it. It requires only a single developer to associate Personally Identifiable Information (PII) with the UDID and share that with the advertising network (Ad-network). If another developer subsequently shares only the UDID of a user, even without sharing PII, the Ad-network can correlate on UDID with previously stored PII, and thus effectively track and identify a user across any number of applications. Users are often completely ignorant of these tracking and linkage behaviors.

The emergent mobile industry lacks standards to address this problem, and the biggest consumers of user data are in fact entities that are vertically integrated in the device and content segments. Furthermore, in the telecom space, we have found that there is potential demand for a privacy preserving mechanism that enables controlled sharing of user data with third party service providers. Embodiments of the present disclosure can be applied as a "white-label service": matching services to customers that require data mining, and data protection to customers who already had data and algorithms but needed consumer protection. A white-label service is one, especially common in the in the financial sector, where the provider of the service purchases a fully supported product from another source, then applies its own brand and identity to it, and sells it as its own product. The purchaser typically assumes the seller is selling its own product.

We have considered interfaces with both mobile Ad-network and telecommunications service providers to define a specification. One advantage of our system is to unbundle sensitive personal user data from static UDID information that could be used to track mobile users; essentially mobile equivalent of the soft cookies used by web browsers. We determined how to build a mechanism that lets ad networks or other third party service providers learn less about a user, but faster. Specifically, in the preferred embodiment of FIG. 9, the protocol shares with Ad-network the zip, age and gender information of users they currently do not know (they already can identify some users through either merchant or developer channels). The intuition is to let ad-nets know the above triplets as quickly as possible before they begin to use device identifier/IP/time to uniquely identify a user. If an Ad-network only cares about that information then we provide users an opportunity to share that efficiently since the triplet is not identifiable at scale—it is something that can be looked up in the census data. Due to regulatory and legal constraints of telecommunications companies, it is preferable that the majority of the cryptographic protocol to be implemented on the device.

Figure 9:
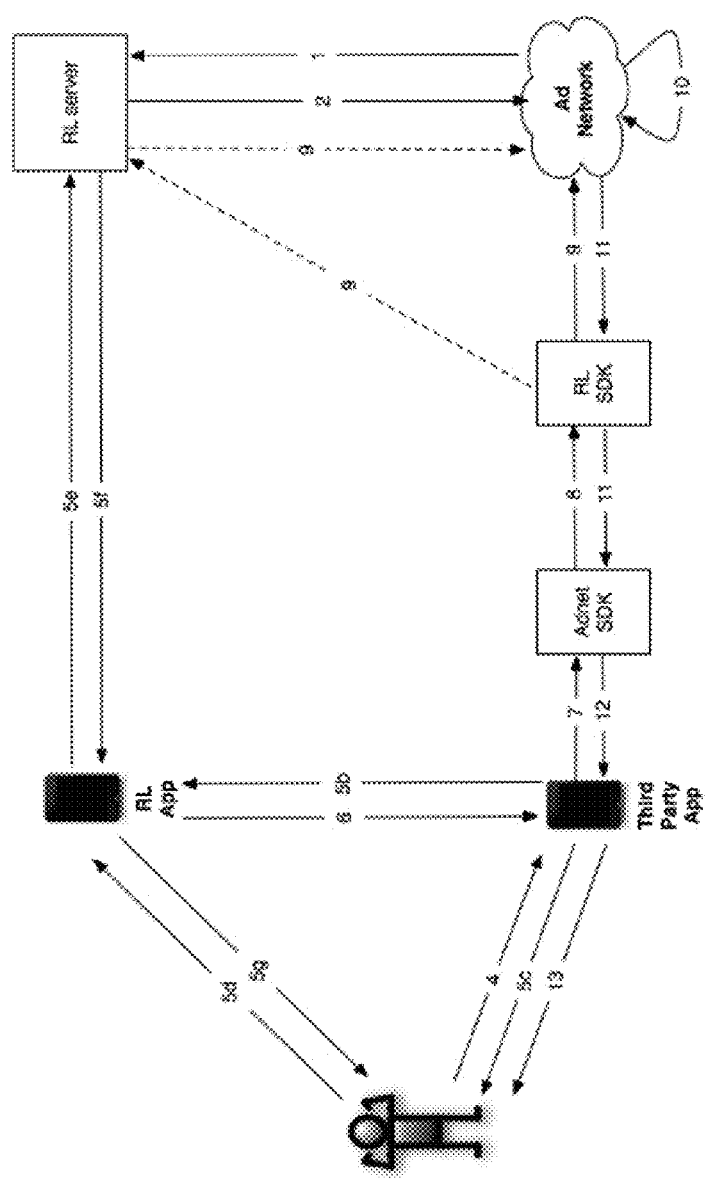
FIG. 9 is a simplified flow diagram illustrating one example of a protocol that enables controlled sharing of information about a user with an ad network or other third-party service provider, consistent with the present disclosure.

We first describe the key players that the protocol of FIG. 9 coordinates. Users: Each user is a person; we assume each user has (fixed) demographic profile as well as a "usage history" that increases with time (for our purposes, this includes location information, app usage patterns, etc). Users would like to keep all information about themselves "as private as possible". We assume each user is represented by one or more devices (running apps). For simplicity, we assume users do not share devices. We can think of the devices' fixed unique identifier (UDID) as part of the users' demographic information and their network addresses/location as part of the usage history. Sellers: provide ads to Ad networks. Sellers may want to keep client list private. Ad-networks: Have (secret) algorithms for matching user profiles to specific ads. App developers: provide (untrusted) apps that run on user's devices. The apps are the conduit for displaying ads to users. App developers have no private information of their own. RobustLinks: a trusted intermediary. Adversary: the adversary represents a coalition of all the "malicious" parties. We will define different levels of security depending on who the adversary is (e.g., we can consider malicious Ad-networks and sellers either separately or in collusion). The sequence of flow is as follows: (1) Users are shown ads by Apps and may choose to "click" on some of them, (2) Sellers pay ad networks something that depends on the number of user "views" and "clicks" (for simplicity, lets assume a "click" is equivalent to a sale) (3) Ad networks pay App developers also based on views/clicks.

The designed protocol is shown in FIG. 9. Protocol steps are as follows: (1) Ad-network registers with RobustLinks server (RL server) using its public key. (2) RL server returns to the Ad-network the RL signed public key. (3) Not shown, but the ad-network distributes its SDK to third party apps with: (a) the signed public key included and (b) RobustLink SDK. Third party app integrates the Ad-net SDK. (4) User interacts with the third party app. (5) If the third party app does not know the user it: (5a) first checks RL app is on user's device (using the URLscheme). (5b) If RL app exists on the device then the third party app makes a user data request, passing the signed public key of the ad-network for identification. (5c) If the RL app does not exist on the user's device then the Ad-net SDK will popup a message to the user to notify them of the mechanism and download link. (5d) If the user does download the RL app and provide their information to the RL app then the RL app stores that information about the user locally on its (sandboxed) location (or encrypted in the keychain). (5e) User's (age,gender,ZIP, time, IP) is sent securely to RL server. (5f) Server computes uniqueness score of user and deletes local copy of user data. (5g) User is shown uniqueness score. (6) Once user data is stored on RL app any user data request call by third party apps with the signed public key then returns user data encrypted using the public key. This step occurs only once per RL app download or profile change (e.g. different IP address). (7) The user data is then passed to the SDK. (8) Ad-NetSDK requests an ad for given user. (9) RL SDK, onboard the Ad-net SDK, then encrypts the user data for each transaction with the Ad-network. In other words, all communication between the third party app and the adnetwork has to be mediated by the RL SDK. The ad-network is either contractually obliged to comply with this requirement or else agrees to share its SDK source code with RL for inspection. If our app does not exist on the user device then the Ad-network SDK is free to communicate with the adnetwork but cannot read or sent the UDID. RL SDK then communicates the encrypted segment either directly with the AdNetwork or indirectly via RL server proxy. Latter is to proxy the current IP address of user to reduce the possibility of identifiability by network address. (10) The ad-network uses its private key to decrypt the encrypted user data. (11) The Ad-network sends an ad to the device. (12 optional) SDK hands the ad to the third party app. (13 optional) Third party app displays the ad to the end user.

Preferred Protocol Requirements:

The privacy guarantees we wanted to give were: (1) user is not linkable and trackable and (2) the only linkage Ad-network should see is that user information is the same. We found that our requirements implied some minimal inherent privacy loss because: (1) Users will learn which ads they are shown (may give some information about the Ad-network's algorithms), (2) Apps will also learn which ads are shown to users (since they must display the ads); malicious apps may communicate this to app developers, (3) Communication between Apps and Ad-network reveals some of the usage pattern (in particular, it reveals the time of the communication and the network address of the user's device) and (4) Monetary transactions occur outside the protocol, hence Ad-network will learn the amount they are paid by Sellers, and the amount they pay App developers, Sellers will learn the amount they pay Ad-networks, etc. This gives some information about which/how many ads were viewed/clicked on. Thus, to guarantee absolute privacy was costly.

We found that even differential privacy seems infeasible. A differential-privacy guarantee (for users) would say something like: For every possible set of users, and any possible prior knowledge of the adversary, if we take a single user and replace all his data with something different, the adversary's output will not change much. However, in the worst case, the minimal information may already be too much for a claim like this to hold. For example, a network address may identify an individual user uniquely, so that individual's usage pattern will become visible. Also, for certain ad pricing functions, even if payments are aggregated the total amount transferred may still reveal whether individual ads were clicked/seen or not (and depending on how targeted they are, might reveal if a specific individual clicked on them).

Weaker Guarantees

Our protocol guarantees will therefore be weaker. Ideally, we would first like to claim that our protocol doesn't "leak" anything more than the minimum described above. In theory, this could be done easily with a completely trusted party (e.g., such as RobustLinks), and with more complexity even in the absence of a trusted party (using secure computation). However, even the easy case was costly because it would require Users, Ad-networks and Sellers to give all of their information to the trusted party which would compute on its own which ads to show the Users and mediate transactions between users and Sellers. What our current protocol does guarantee is slightly weaker: (1) App developers learn only which ads were shown (and when) [in addition to any knowledge they already had about their users]. (2) For views (without clicks) Ad-networks learn only tuples of the form (time, network address,basic demographic profile) (3) For clicks, Ad networks learn a tuple of the form (time,network address, basic demographic profile, ad-id, all information about user shared by seller). Note that just the fact that the user clicked on a certain ad may give away private information about that user (e.g., an ad could be targeted towards specific subsets of users). Intuitively, if there are enough users with the same demographic profile, and the time/network addresses are from large enough pools, this appears to give fairly good privacy (as long as user never click on an ad). If Sellers are honest and don't share information with the Ad-networks, this seems ok even if ads are clicked. It's much better than what you get if there's a UDID attached to the ad view (then every user is unique, and their history is always linkable). However, the worst-case was still quite not acceptable. We required to quantify "enough users" or "large enough pools".

Client-Side Architecture (BigSieve): Discovering User Applications.

As described above, potential uses of the (white label) OpIndex service requires a proof of concept. Therefore in tandem we built a mobile app recommendation (called "BigSieve") on a mobile device that demonstrated the power of our underlying OpIndex concept. BigSieve is currently an IOS proof of concept app designed to generate data for the OpIndex stack by: (1) discovering and building an inventory of users IOS applications, (2) matching users to one another and 3) allowing similar users to see the app inventory of people like them. The first problem was maintaining records given the rate of app updates and release rate (new apps alone are currently at 16,260 new apps per month, with total of 15 billion downloads to date). To keep an updated list of potential apps for which we should check, we joined the Apple's Enterprise Partner Feed (EPF) program, which allows subscribers to download new app data on a daily basis. We automated the daily process of data download, parsing and storage in a relational database. The second and more costly discovery problem was that, due to sandbox restrictions imposed by IOS, BiGSieve could not simply obtain a list of installed apps on a user device. We had to develop alternative scalable databases, APIs, protocols and detection logic to detect apps on the user's device. As of this writing we have designed and built the majority of BigSieve's user interfaces, application logic and data layers. Remaining tasks are integration with the remaining matching layer and data APIs. Once developed and tested we plan to submit the app to IOS app store.

Matching Service

Expertise and interest matching services were implemented in Apache's open source information retrieval tool Lucene (version 3.2). We downloaded, parsed and preprocessed the latest Wikipedia dump before indexing it using Lucene. Matching was then implemented as Lucene queries on the index, followed by pair-wise updating of the term-term similarity bipartite graph. As will be explained below, due to the large scaled nature of the dataset, representing and computing the Wikipedia category graph was too costly (there are currently 88 million nodes in the graph. Building the graph alone took a 1.5G of RAM. Analysis of the graph was therefore too costly).

Demographic matching in turn was simply computing the Euclidean distances given the metric space defined in section "Matching". Given the weight and value for each dimension the final similarity of a pair of objects was computed online by an Approximate Nearest Neighbor (ANN) algorithm. ANN is a variant of the better-known K-Nearest Neighbor algorithm. Nearest neighbor algorithms calculate distances between data points using any or multiple algorithms from a class of distance functions known as Minkowski metrics. In particular, they store sets of data points P in d-dimensional space using an efficient kd-tree data structure such that given any query point p, a set of k nearest points may be efficiently retrieved. Points are generally represented as coordinate vectors within the data structure.

Figure 2:
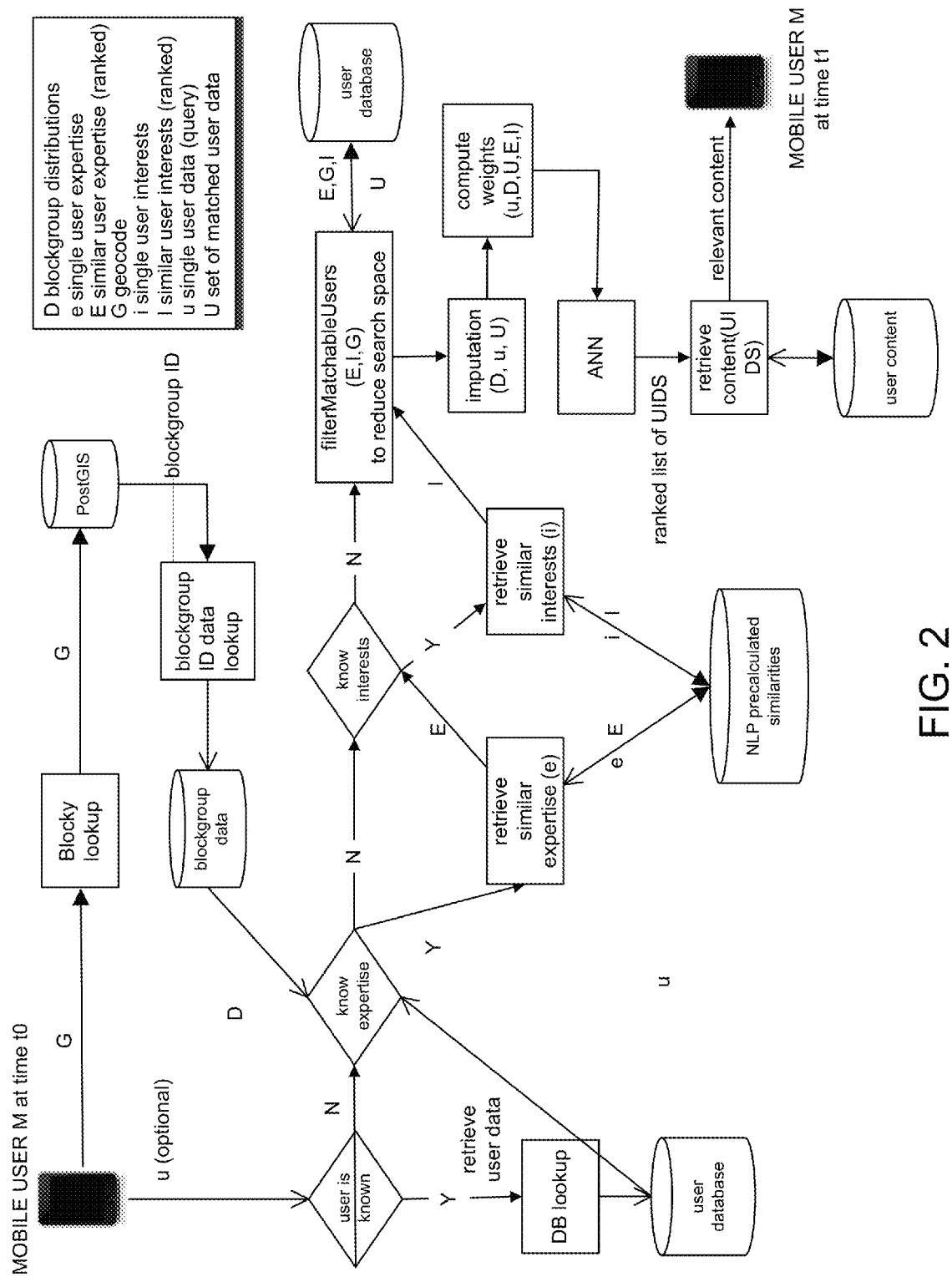
FIG. 2 is a detailed overview of the logic consistent with the present disclosure.
Figure 8:
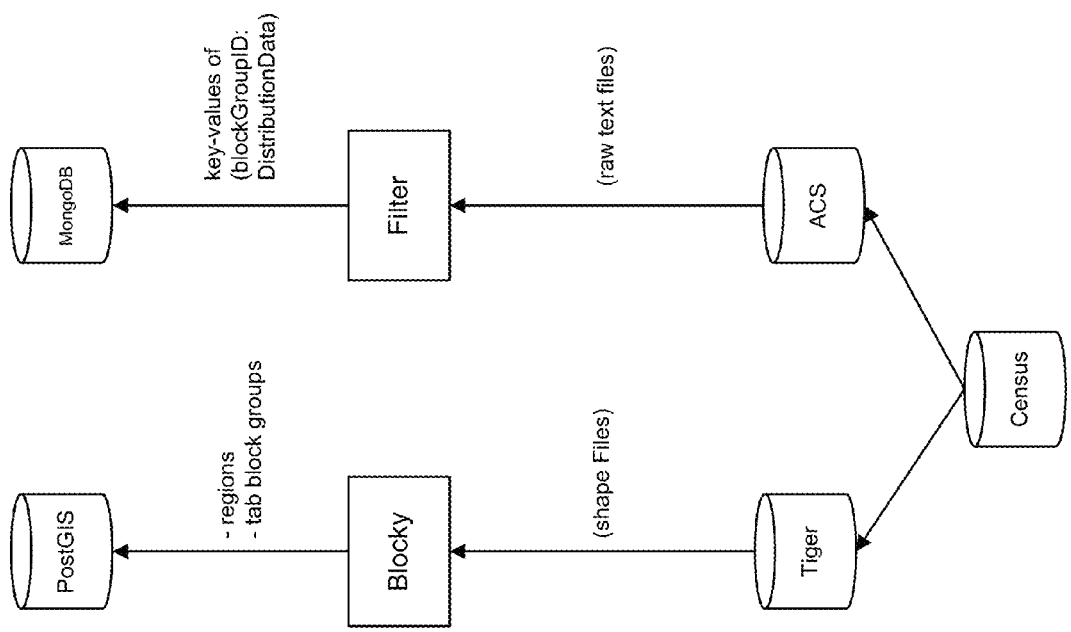
FIG. 8 is the flow of data and steps involved in building the demographic knowledge base consistent with the present disclosure.

For high availability reasons, we designed the matching service to run the ANN algorithm on multiple daemon instances. ANN processing data for a given query is retrieved via communication with multiple components, as described in FIGS. 2 and 8. Given a user's location, we determine both the specific statistical area in from which the user is accessing BigSieve and, for other applications, the proximity of the user to other users of the application for the purposes of location-based matching. To this end a suite of server-side functions has been built implementing a POSTGIS database structure. POSTGIS is a agent-specific implementation used to provide GIS (Geographic Information Services) lookup functionality for data stored within a postgresql (hence POST) database. POSTGIS was chosen for its known robustness as well as its ability to work with services, shapefiles and other formats provided by TIGER, the geographical encoding and reference system implemented by the US Census as a complement to its statistical data services. These implementation choices are intended as illustrative and not limiting.

We first built a service called Blocky. The service determines, using a PostGIS locations database, the specific block or block-group IDs given user's current geolocation (G). The block-group id is used to look up the local demographic distribution and statistical data (D), stored previously in the warehousing layer, as described below. A request may contain a user's opted-in data (u). If the user is already known to the system, additional data may be procured from the user database to further complete (u). If the expertise or interests are already known by the system or have been input by the user, a lookup is performed on the data previously calculated by the NLP and data mining algorithms on the Wikipedia knowledge base. Ordered and ranked lists of similar expertise (E) and interests (I) will be returned given a single user's expertise (e) and interests (i) respectively. Given the set of known data, it may now be possible to filter the subset of total system users such that a lower-overhead and more intelligent data lookup is possible.

The user database may be queried to retrieve only users matching within a certain score range or (more simply) within the first N entries in the ordered lists representing similar interests (I) or expertise (E), and the query size may further be reduced by restricting the search within a specified geographical locus if desirable, as the user databases are both sharded by location and running PostGIS, making location-based object queries a viable option. In the absence of any or all of the similarity data E,I or G the database query will simply be broader. For speed and redundancy we further maintain at all times a complete user data set in memory for those instances when filtering is not viable (thus avoiding retrieval of a large dataset from the database in this event). Once the set of users to be considered for matching is known, we impute user data u if u is incomplete and then calculate the weights $\omega_i \ldots \omega_n$ on each of the matching dimensions, using the various assembled data. To impute user data from geolocation we refer to the Census demographic data which has been previously been downloaded from public FTP servers, parsed using the versatile text processing capabilities of Python, and stored in the warehousing layer using MongoDB, a NoSQL database incorporating the speed and utility of its predecessors such as Berkeley DB as well as a useful subset of the indexing and search abilities provided by traditional relational database systems (RDBMS). These arrangement is merely a preferred embodiment.

The ANN algorithm is wrapped by an in-memory daemon service for additional speed that maintains an active data structure containing user data from the application database, thus minimizing the need for costly database lookups on a per-query basis. For additional redundancy and scalability, the application architecture provides the ability to deploy and run multiple concurrent processing instances of the ANN daemon based on real-time client-side demand. Finally, the ANN algorithm is performed using the determined weights, resulting in an ordered list containing the ids of the best matching users. These ids are used to look up the desired content from the application databases and the sorted relevant results are returned to the end user.

In brief, a preferred embodiment may include the following components. Bundle of indices. To lower the cost of integration into existing business models of potential use cases, OpIndex indexes not only citizen's demographics, interests and expertise. (Collective Intelligence) algorithms, data structures and protocols were researched and developed to enable this extended functionality.

Matches and clusters users. OpIndex enables personalization and targeting services to not only individual users but also a cluster of similar users. This feature was designed to lower the cost of integrating OpIndex into existing media buy and sell side work flows that currently use Nielsen Designated Market Area information. OpIndex will provide potential customers data driven segments that are more dynamic and fine grained than current DMAs that are provisioned in an ad-hoc manner by Nielsen.

Models objects. The addition of demographic, interests and expertise indices to OpIndex enables matching and targeting of any object. Users can be matched to other users, or to messages (deals, coupons, advertisements, etc.) The only requirement OpIndex places on content publisher is that an object be described using one or more of demographic, expertise and interest dimensions. This flexibility enables more commercialization opportunities than opinions alone.

Incremental quality of service: The service places minimal requirements on user information (current location). Corollary to this, integration with third party services is low cost. Quality of Service (QoS) is on the other hand lower, incrementally increasing with additional user information.

Trusted: The service is designed to be trusted. It does not require user to reveal identifiable information. Users can instead use the service by simply revealing their interest and expertise, non Personally Identifiable Information (PII).

Gives users of a mobile device the option to opt-in to a data sharing mechanism where some or all of their data can be shared with third parties without revealing unique tracking information.

It will be apparent to those having skill in the art that many changes may be made to the details of the above-described embodiments without departing from the underlying principles of the invention. The scope of the present invention should, therefore, be determined only by the following claims.

The invention claimed is:

1. A computer-implemented method for understanding the meaning of an object given its unstructured textual description and using that understanding together with a user's demographics to retrieve other demographically and psychographic similar objects stored in an index, comprising the steps of:
   provisioning a server coupled to a network for communications;
   indexing a large corpus of anonymous demographic data defined at multiple levels of granularity;
   indexing a large knowledge corpus of encyclopedic text articles to form a content vector space defined by the text content;
   indexing knowledge corpus of encyclopedic text article categories and their interconnections to form a category space defined by a set of categories;
   storing in a datastore accessible to the server, data representing the content of the text articles represented as an inverted index;
   storing in a datastore accessible to the server, data representing the category space represented as a directed cyclic graph;
   acquiring individual location associated with each one of a plurality of remote users over the communications network;
   acquiring text data associated with each one of the plurality of remote users over the communications network;
   acquiring, directly, psychographic data associated with each one of the plurality of remote users over the communications network;
   projecting the location data associated with each one of the plurality of remote users over the communications network onto the demographic knowledge base to infer their demographic data;
   projecting the text data associated with each one of the plurality of remote users over the communications network onto the encyclopedic knowledge base to infer their similarity data;
   projecting the acquired user text data on to the defined category space to infer psychographic data, including representing each user's characteristics as an n-dimensional concept vector based on the said category space, each dimension having a binary value for including, or conversely excluding, the corresponding category;
   receiving data at the server associated with an object for matching the object to at least one of the remote users, wherein the object data includes at least minimal demographic data and psychographic data associated with the object;
   projecting the received psychographic object data on to the defined category space, including representing the object as an n-dimensional concept vector;
   determining a first similarity metric for each user relative to the object, based on the corresponding demographic data;
   estimating a second similarity metric for each user relative to the object, based on the corresponding n-dimensional concept vectors; and
   matching the object to at least one of the users based on a weighted combination of the first and second similarity metrics.

2. The method of claim 1 wherein the user psychographic data includes indicia of the corresponding user's interests, activities and/or opinions.

3. The method of claim 1 wherein said estimating the second similarity metric when user has revealed psychographic dimension comprises:
   searching and retrieving encyclopedic text that mention the user term describing their psychographic variable;
   searching and retrieving encyclopedic text that mention the term describing the object being matched;
   projecting and filtering encyclopedic text that mention both i) the user term describing their psychographic variable and ii) the term describing the object being matched retrieving the category of the projected articles; and
   determining the weight of the article as the information content of overlapping categories using the weight of the article to disambiguate and boost encyclopedic text that are "closer" to the user and object terms.

4. The method of claim 1 wherein said estimating the second similarity metric when user has not revealed psychographic dimension comprises:
   extracting the title of the object the user has some affinity over matching the object data to one of the text articles of the encyclopedic text corpus;
   retrieving the category of the matching article;
   representing the category of the matching article in the expanded n-dimensional category space; and matching object with n-dimensional category representation to other objects with n-dimensional category representation through pairwise similarity steps as in claim 3.

5. The method of claim 1 wherein the user data is acquired and sent to the server by an application program executable on the user's mobile device.

6. The method of claim 5 wherein the application program enables the user to opt-in to incrementally share the user's context information, minimally including current location, and potentially expertise, interest and demographics.

7. The method of claim 1 including assessing similarity between each user and each object responsive to the first and second similarity metrics.

8. The method of claim 1 including assessing similarity between each user and each other user based on the first and second similarity metrics.

9. The method of claim 1 wherein the demographic data includes age, gender, education, and ZIP code.

10. The method of claim 1 including computing a relationship between the words expressing the users' characteristics using a large encyclopedic corpus.

11. The method of claim 1 including, in a case where the acquired user demographic data is missing a dimension necessary to determining the first similarity metric, computing an expected value of the missing dimension data by mining a demographic knowledge base.

12. The method of claim 11 wherein the demographic knowledge base comprises a U.S. Census knowledge base.

13. The method of claim 11 wherein the demographic mining includes:
 (a) retrieving, offline, from a public database a block level information about a set of demographic dimensions and their statistical distribution. One such database is US Census;
 (b) computing an expectation of a user's demographic along all dimensions given only their location data (either as ZIP code or geocode);
 (c) imputing values for missing demographics when user has provided values over one or more but an incomplete list of demographics;
 (d) computing the uniqueness of the individual as how much the user is different from the average. Knowing some data allows the algorithm to assign weights to demographic dimensions; and
 (e) computing (using a memory-based algorithm) the metric distance (hence similarity) of user's demographics based on their (given or imputed) n-dimensional vectors.

14. The method of claim 1 including, in a case that a user expresses an interest or expertise that has a corresponding encyclopedic document, using Wikipedia as a knowledge base, to form vector space matching with other objects.

15. The method of claim 14 including, since the domain of data in the category space representation are binary, computing the similarity of two objects by computing the Jaccard coefficient which measures the degree of similarity between two sets.

16. The method of claim 14 including, when users provided information about their interests directly, using document content, in particular term frequency, to represent their interests; and, when interests and expertise are expressed indirectly (and continuously, through third party data providers), we chose the document category representation.

17. The method of claim 1 including representing the psychographic data as an n-dimensional concept vector of Wikipedia. Given an input instance we first retrieved the Wikipedia article that either (i) match exactly the title/redirect of the instance title, or (ii) fuzzy match the content of all wiki articles, or failing those (iii) match a given external category. We then retrieve the category of the matching article and represent it in the n dimensional category space.

* * * * *